(12) United States Patent
Liao

(10) Patent No.: US 6,256,861 B1
(45) Date of Patent: Jul. 10, 2001

(54) AUTOMATIC HARD DISKDRIVE READ/WRITE ARM FABRICATION SYSTEM

(75) Inventor: C. Y. Liao, Taipei-Hsien (TW)

(73) Assignee: Annex Technology International Co., Ltd., Taipei Hsien (TW)

( * ) Notice: Subject to any disclaimer, the term of this patent is extended or adjusted under 35 U.S.C. 154(b) by 0 days.

(21) Appl. No.: 09/343,367

(22) Filed: Jun. 30, 1999

(51) Int. Cl.⁷ .................... B23Q 3/02; B23Q 7/02; B23P 19/04
(52) U.S. Cl. .................... 29/563; 29/33 J; 29/38 C; 29/564
(58) Field of Search .................... 29/564, 563, 33 P, 29/33 J, 38 C, 564.1, 33 K, 564.7; 198/346.1, 465.1, 465.3, 476.1

(56) References Cited

U.S. PATENT DOCUMENTS

| | | | |
|---|---|---|---|
| 3,946,484 | * 3/1976 | Aronstein et al. | 29/563 |
| 4,301,581 | * 11/1981 | Bader et al. | 29/38 C |
| 4,418,464 | * 12/1983 | Di Giancomo et al. | 29/564.1 |
| 4,751,361 | * 6/1988 | Inoue et al. | 29/564 X |
| 4,795,021 | * 1/1989 | Möller | 198/346.1 |
| 5,315,750 | * 5/1994 | Roseliep | 29/563 |
| 5,454,148 | * 10/1995 | Ewer et al. | 29/33 J |

* cited by examiner

Primary Examiner—William Briggs
(74) Attorney, Agent, or Firm—Pro-Techtor International Services

(57) ABSTRACT

An automatic hard diskdrive read/write arm fabrication system, which includes a plurality of rotary tables arranged in a line, conveyer means arranged at one side of the rotary tables for carrying shaped material blocks to the rotary tables for processing into finished hard diskdrive read/write arm, a set of processing implement respectively disposed adjacent to the rotary tables and controlled to process shaped material blocks into finished hard diskdrive read/write arm, and a plurality of transferring tool means, for example, mechanical arms controlled to transfer shaped material blocks from the conveyer means to the rotary tables for processing by the processing implement respectively, and to transfer processed shaped material blocks from the rotary tables to the conveyer means.

5 Claims, 6 Drawing Sheets

AUTOMATIC HARD DISKDRIVE READ/WRITE ARM FABRICATION SYSTEM

BACKGROUND OF THE INVENTION

The present invention relates to a hard diskdrive read/write arm fabrication system, and more particularly to an automatic hard diskdrive read/write arm fabrication system which achieves high hard diskdrive read/write arm fabrication efficiency, and saves hard diskdrive read/write arm manufacturing cost.

Following fast development of high technology, a variety of computer-controlled implement have been developed, and intensively used in the fabrication of a variety of products. For example, CNC (computer numerical control) automatic cutting machines have been used in the fabrication of hard diskdrive read/write arms. However, conventional methods of using CNC automatic cutting machines for the fabrication of hard diskdrive read/write arms still have drawbacks as outlined hereinafter.

1. Fabrication efficiency cannot be greatly improved:
   Because processing a blank material block into a finished read/write arm includes more than 20 processing steps, it is low efficient to let the workpiece receive all processing steps that are not continuously performed.
2. Fabrication procedure cannot be automatically achieved:
   Because one CNC cutting machine has at least two molds for carrying a number of workpieces each, it takes much time to put workpieces in each mold.
3. Manufacturing cost is high:
   Because conventional methods cannot use CNC cutting machines to form a fully automatic fabrication line, much works must be performed by man labor, thereby causing the manufacturing cost unable to be greatly reduced.
4. Product quality is unstable:
   Because much main labor is used during fabrication of read/write arms, main error is inevitable, processed workpieces tend to be damaged, or differently processed workpieces tend to be mixed together when delivered by labor from one processing station to another.

SUMMARY OF THE INVENTION

The present invention has been accomplished to provide an automatic hard diskdrive read/write arm fabrication system which eliminates the aforesaid drawbacks. It is one object of the present invention to provide an automatic hard diskdrive read/write arm fabrication system which achieves high hard diskdrive read/write arm fabrication efficiency. It is another object of the present invention to provide an automatic hard diskdrive read/write head fabrication system which greatly educes the hard diskdrive read/write arm manufacturing cost. It is still another object of the present invention to provide an automatic hard diskdrive read/write head fabrication system which achieves high quality control. According to one aspect of the present invention, there is provided an automatic hard diskdrive read/write arm fabrication system, which comprises a plurality of rotary tables arranged in a line, conveyer means arranged at one side of the rotary tables for carrying shaped material blocks to the rotary tables for processing into finished hard diskdrive read/write arm, a set of processing implement respectively disposed adjacent to the rotary tables and controlled to process shaped material blocks into finished hard diskdrive read/write arm, and a plurality of transferring tool means, for example, mechanical arms controlled to transfer shaped material blocks from the conveyer means to the rotary tables for processing by the processing implement respectively, and to transfer processed shaped material blocks from the rotary tables to the conveyer means. According to another aspect of the present invention, the rotary tables each comprise a plurality of platforms equiangularly arranged around the respective center shaft, a plurality of workpiece holders respectively provided at the platform for holding shaped material blocks for processing by the processing implement, and a plurality of reciprocating rods radially extended from the respective center shaft toward the platforms and reciprocated by compressed air source means between a first position where the reciprocating rods are pressed on a respective shaped material block at the workpiece holder of each of the platforms, and a second position where the reciprocated rods are moved away from the platforms. According to still another aspect of the present invention, the reciprocating rods each have a front fork and a workpiece holding down means coupled to the front fork and controlled to hold down a workpiece at the workpiece holder at each of the platforms.

DETAILED DESCRIPTION OF THE PREFERRED EMBODIMENT

Figure 1:
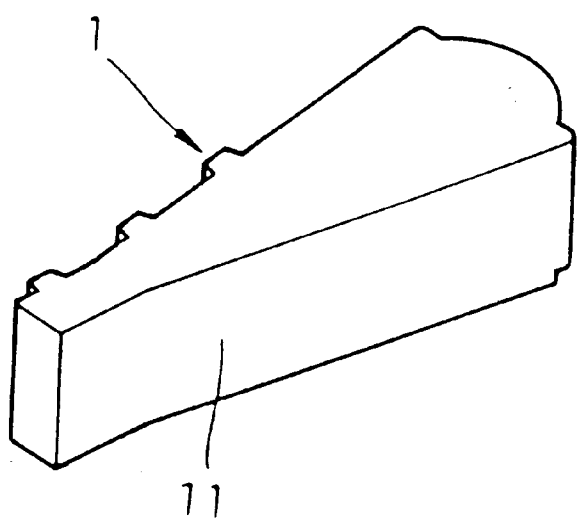
FIG. 1 is an elevational view of a shaped material block before processing into read/write arms.
Figure 2:
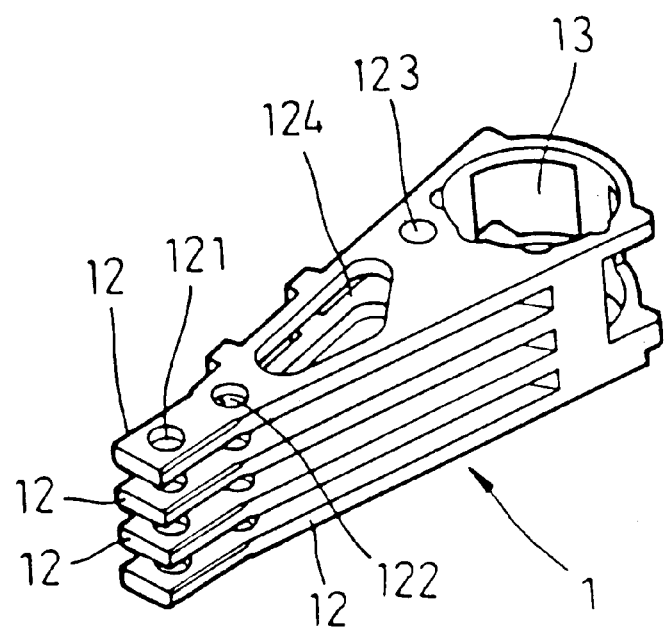
FIG. 2 is an elevational view of a finished hard diskdrive read/write arm.

Referring to FIGS. 1 and 2, the thickness 11 of a shaped material block 1 is cut into a stack of linked arms 12 by dividing the thickness 11 of the shaped material block 1 into equal parts. The arms 12 are processed to provide a respective read/write head mounting hole 121 at one end for the installation of a read/write head, a respective shaft mounting hole 13 at an opposite end for the installation of a driving shaft, a respective counterweight hole 124 on the middle for the installation of a counterweight, and respective locating holes 122 and 123 at suitable locations for the positioning of processing implement.

As indicated above, the procedure of fabricating a read/write arm for a hard diskdrive includes the processing of the arms 12, and the processing of the shaft mounting holes 13, read/write head mounting holes 121, counterweight holes 124 and locating holes 122 and 123 at the arms 12.

Figure 3:
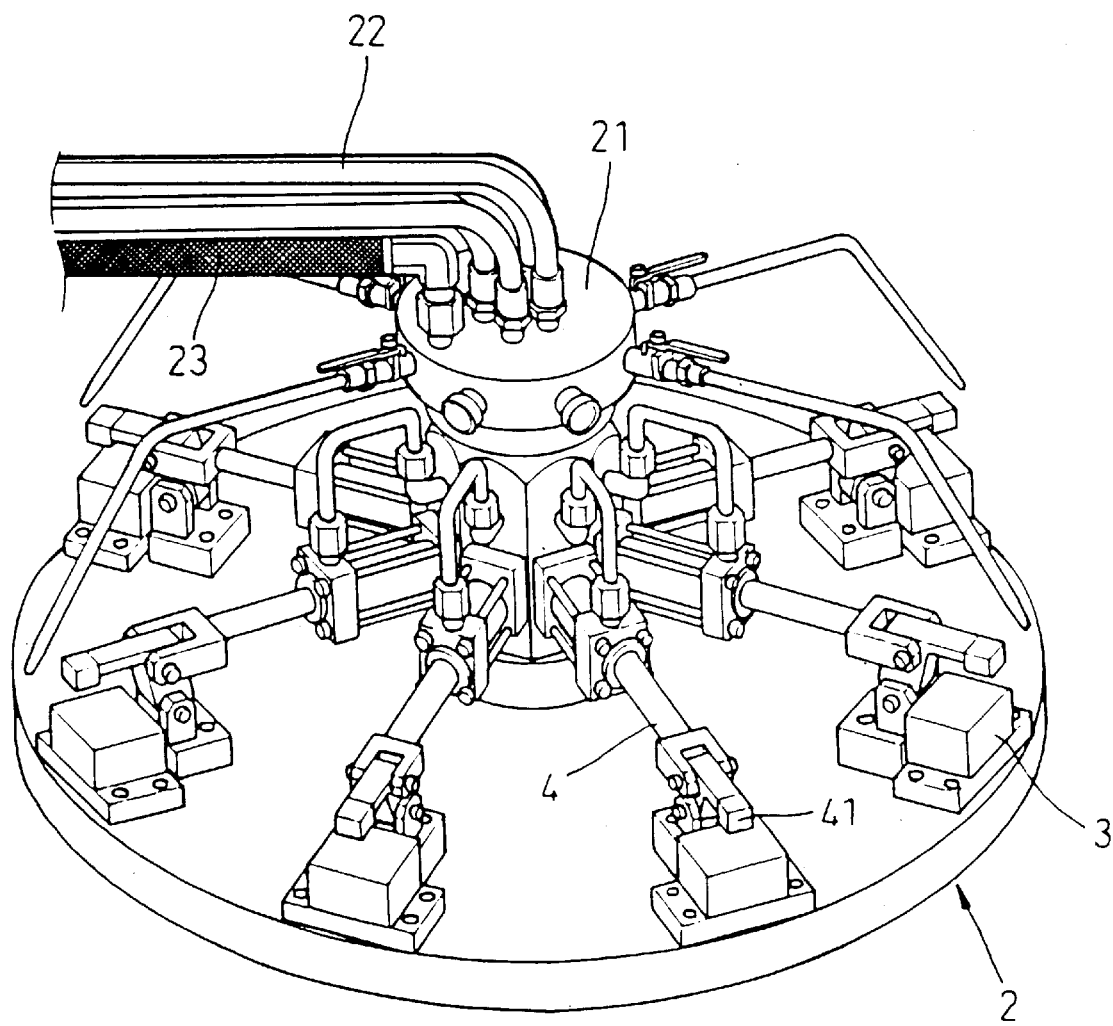
FIG. 3 is a perspective view of a part of the present invention, showing the arrangement of one rotary table.
Figure 4:
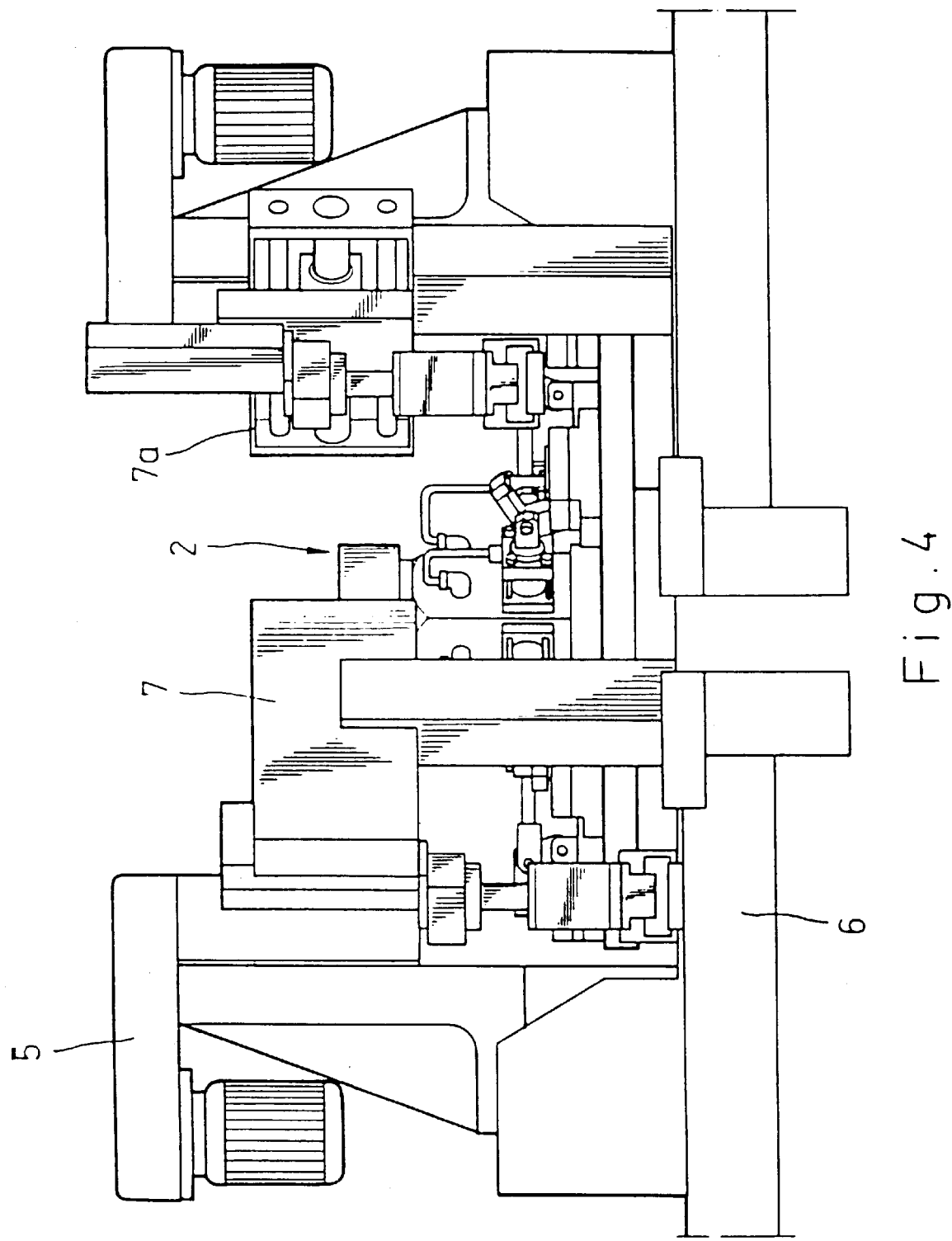
FIG. 4 is a plain view of a part of the present invention, showing the arrangement of the rotary table, the cutting apparatus, the conveyer means, and the mechanical arm.
Figure 5:
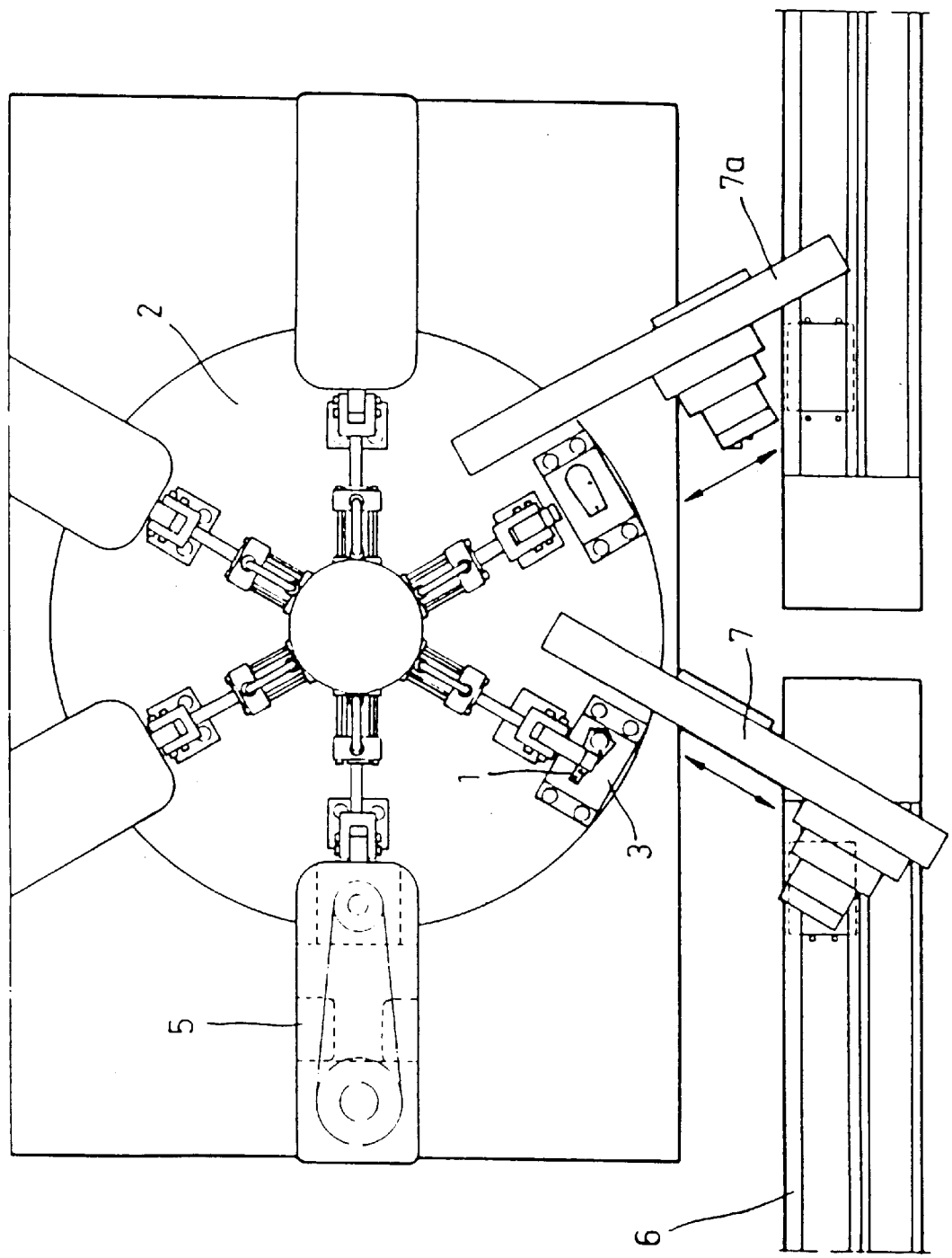
FIG. 5 is a top view of FIG. 4, showing the operation of the mechanical arms.

Referring to FIGS. 3, 4 and 5, an automatic hard diskdrive read/write arm fabrication system in accordance with the present invention comprises a plurality of rotary tables 2 (only one table is shown), each rotary table 2 coupled to a respective center shaft 21, cutting apparatus 5 and conveyer means 6 disposed around the rotary tables 2, and workpiece picking-up and transferring tool means for example mechanical arms 7 disposed adjacent to the conveyer means 6 for picking up workpieces from the conveyer means 6 to the rotary tables 2 for processing. Each of the rotary tables 2 comprises a plurality of platforms 3 equiangularly spaced around the respective center shaft 21 at the top, a plurality of workpiece holders 31 respectively provided at the platforms 3, a plurality of reciprocating rods 4 respectively and radially extended from the center shaft 21 toward the platforms 3. A plurality of air pipes 22 and a fluid pipe 23 are respectively connected to the center shaft 21. The air pipes 22 are connected to a compressed air source (not shown), which is controlled to reciprocate the reciprocating rods 4. The fluid pipe 23 is connected to a cutting fluid/lubricating oil supply device.

Figure 6:
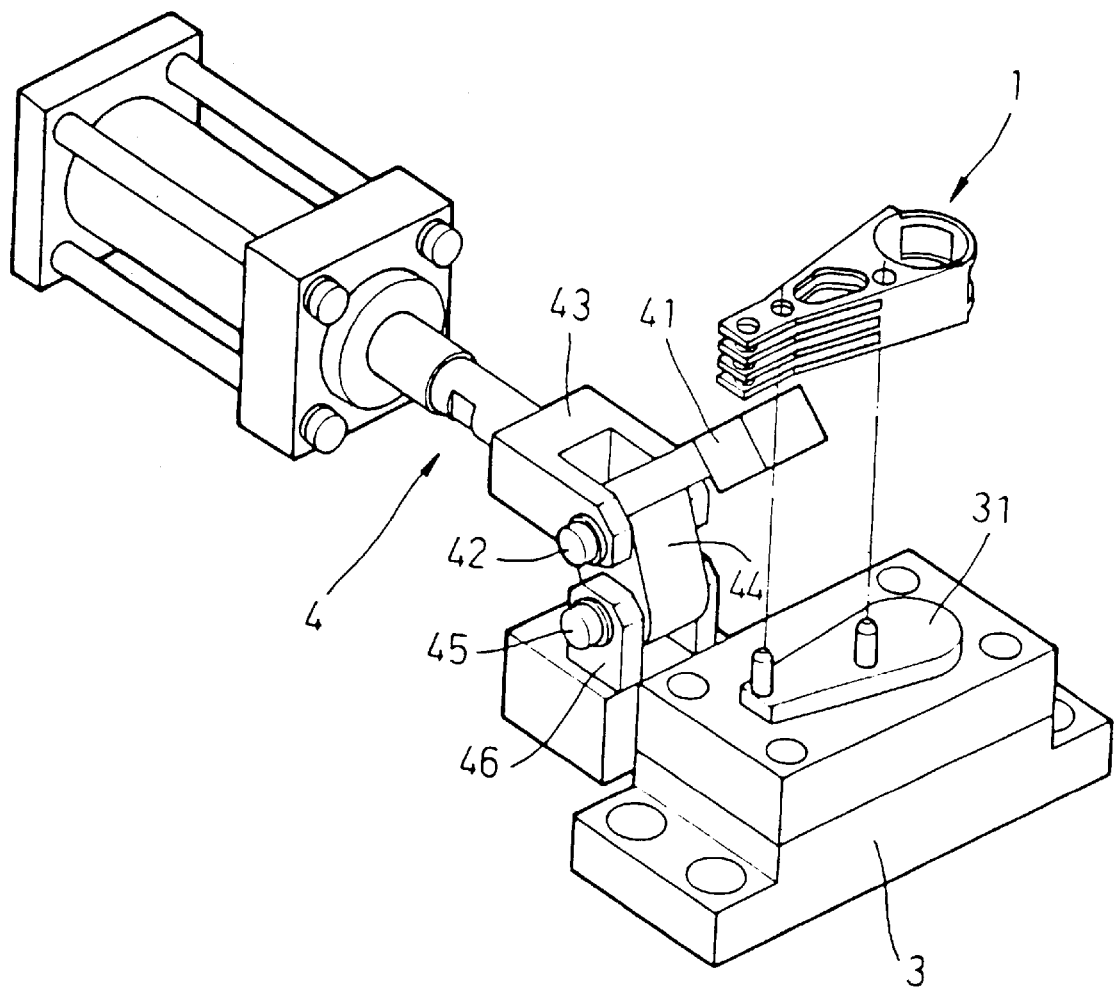
FIG. 6 illustrates the arrangement of the reciprocating rod and the relative platform.
Figure 7:
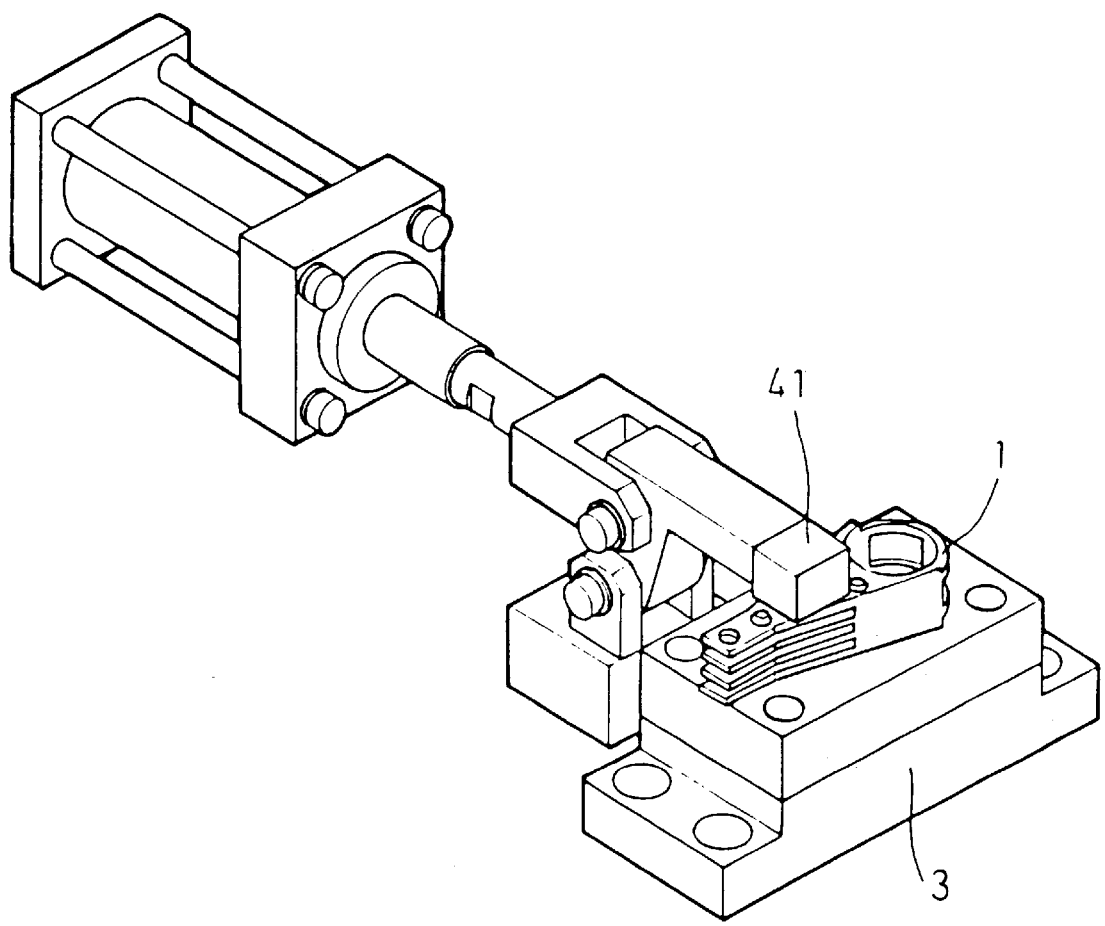
FIG. 7 is similar to FIG. 6 but showing the holding down block pressed on the shaped material block at the workpiece holder above the platform.

Referring to FIGS. 6 and 7, the reciprocating rod 4 comprises a front fork 43, a holding down block 41 pivoted to the front fork 43 by a pivot 42. The holding down block 41 has a fixed end coupled to the pivot 42 at the front fork 43 of the reciprocating rod 4, and connected to a fixed locating block 46 at the rotary table 2 (see also FIG. 3) by a link 44. The link 44 has one end connected to the fixed end of the holding down block 41, and an opposite end pivoted to a pivot 45 at the fixed locating block 46. When the workpiece, namely, the shaped material block 1 is carried from the conveyer means 6 to the workpiece holder 31 at one plate form 3 at the rotary table 2 by one mechanical arm 7, the reciprocating rod 4 is forced by compressed air to extend out, thereby causing the holding down block 41 to be turned downwards and pressed on the shaped material block 1, and therefore the shaped material block 1 is held down at the workpiece holder 31 by the holding down block 41. On the contrary, when the reciprocating rod 4 is retreated (see FIG. 7), the holding down block 41 is lifted from the shaped material block 1, at the same time the rotary table 2 is rotated through an angle to move the shaped material block 1 to a next stop, enabling the primarily processed shaped material block 41 to be picked up from the rotary table 2 to the conveyer means 6 by another mechanical arm 7a for carrying by the conveyer means 6 to the next processing station for further processing.

Referring to FIGS. 4 and 5, The conveyer means 6, the mechanical arms 7 and the rotary tables 2 form a production line. Shaped material blocks 1 are carried on the conveyer means 6 and shifted between the conveyer means and the rotary tables 2 by the mechanical arms 7. Each shaped material block 1 is delivered from one rotary table 2 to another. At each rotary table 2, each shaped material block 1 receives a particular processing process. When finished, every finished read/write arm is carried by the conveyer means to the terminal for packing.

It is to be understood that the drawings are designed for purposes of illustration only, and are not intended as a definition of the limits and scope of the invention disclosed.

What the invention claimed is:

1. An automatic hard diskdrive read/write arm fabrication system comprising:

a plurality of rotary tables arranged in a line, said rotary tables each having a center shaft;

conveyer means arranged at one side of said rotary tables for carrying shaped material blocks to said rotary tables for processing into finished hard diskdrive read/write arms;

a set of processing implements disposed adjacent to said rotary tables, said processing implements process said shaped material blocks into finished hard diskdrive read/write arms; and a plurality of transferring tool means to transfer said shaped material blocks from said conveyer means to said rotary tables for processing by said processing implements. and to transfer processed shaped material blocks from said rotary tables to said conveyer means;

wherein said rotary tables each comprise a plurality of platforms equiangularly arranged around the respective center shaft, a plurality of workpiece holders respectively provided at said platform for holding shaped material blocks for processing by said processing implements, and a plurality of reciprocating rods radially extended from the respective center shaft toward said platforms and reciprocated by compressed air source means between a first position where said reciprocating rods are pressed on a respective shaped material block at the workpiece holder of each of said platforms and a second position where said reciprocating rods are moved away from said platforms.

2. The automatic hard diskdrive read/write arm fabrication system of claim 1 wherein said reciprocating rods each have a front fork and a workpiece holding down means coupled to said front fork, said workpiece holding down means being operated to hold down a shaped material block on the workpiece holder of each of said platforms.

3. The automatic hard diskdrive read/write arm fabrication system of claim 1 wherein the center shaft of each of said rotary tables is mounted with a plurality of air pipes connected to external compressed air source means for guiding compressed air to move said reciprocating rods, and a fluid pipe connected to a cutting fluid/lubricating oil supply device for guiding cutting fluid/lubricating oil to cutting tool means of said processing implements when said processing implements are operated to process shaped material blocks on said platforms of said rotary tables.

4. The automatic hard diskdrive read/write arm fabrication system of claim 2 wherein said workpiece holding down means comprises a holding down block pivoted to the front fork of the respective reciprocating rod by a pivot, said holding down block having a fixed end coupled to the pivot at the front fork of the respective reciprocating rod, a locating block fixedly mounted on the respective rotary table, and a link coupled between the fixed end of said holding down block and said locating block.

5. The automatic hard diskdrive read/write arm fabrication system of claim 1 wherein said transferring tool means are mechanical arms.

\* \* \* \* \*